(12) United States Patent
Andolina

(10) Patent No.: US 11,902,239 B2
(45) Date of Patent: Feb. 13, 2024

(54) UNIFIED APPLICATION MESSAGING SERVICE

(71) Applicant: Salesforce.com, inc., San Francisco, CA (US)

(72) Inventor: Joseph Andolina, Castro Valley, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/146,238

(22) Filed: Jan. 11, 2021

(65) Prior Publication Data

US 2022/0224668 A1 Jul. 14, 2022

(51) Int. Cl.
| | |
|---|---|
| G06F 15/16 | (2006.01) |
| H04L 51/56 | (2022.01) |
| H04W 4/80 | (2018.01) |
| H04W 4/12 | (2009.01) |
| H04W 80/08 | (2009.01) |
| H04W 80/02 | (2009.01) |
| H04L 69/18 | (2022.01) |

(52) U.S. Cl.
CPC .............. *H04L 51/56* (2022.05); *H04L 69/18* (2013.01); *H04W 4/12* (2013.01); *H04W 4/80* (2018.02); *H04W 80/02* (2013.01); *H04W 80/08* (2013.01)

(58) Field of Classification Search
CPC .............. H04L 51/36; H04L 29/06013; H04L 29/06068; H04W 4/80; H04W 4/70; H04W 4/12; H04W 80/02; H04W 80/08
See application file for complete search history.

(56) References Cited

U.S. PATENT DOCUMENTS

| | | | |
|---|---|---|---|
| 9,928,125 B1 * | 3/2018 | Phillips | G06F 9/546 |
| 10,945,105 B1 * | 3/2021 | Konen | H04W 4/029 |
| 11,178,043 B1 * | 11/2021 | Lewis | H04L 45/04 |
| 2005/0278410 A1 * | 12/2005 | Espino | H04L 67/5651 709/201 |
| 2008/0016368 A1 * | 1/2008 | Adams | H04L 63/0853 713/183 |
| 2010/0011374 A1 * | 1/2010 | Cho | G06F 9/546 709/206 |
| 2012/0215880 A1 * | 8/2012 | Lamba | H04L 67/142 709/217 |
| 2014/0241373 A1 * | 8/2014 | Pasam | H04L 45/306 370/400 |
| 2016/0248871 A1 * | 8/2016 | Seed | H04W 4/70 |
| 2017/0279874 A1 * | 9/2017 | Jolfaei | H04L 67/565 |
| 2018/0213378 A1 * | 7/2018 | Brown | H04W 4/70 |
| 2020/0021670 A1 * | 1/2020 | Agerstam | H04L 12/283 |
| 2020/0205081 A1 * | 6/2020 | Garg | H04W 52/0277 |

(Continued)

*Primary Examiner* — Dustin Nguyen
*Assistant Examiner* — Hao H Nguyen
(74) *Attorney, Agent, or Firm* — Kwan & Olynick LLP

(57) ABSTRACT

In a cloud computing environment, a unified application messaging service of an enterprise computing platform enables application developers to rapidly develop and deploy application software using existing message broker services across heterogeneous user systems/devices communicating using different connection/communication protocols. The unified application messaging service includes a connection protocol registrar/tracker logic and a device list maintained with the most current polling status and connection protocol that a user system/device is currently using.

15 Claims, 11 Drawing Sheets

(56) References Cited

U.S. PATENT DOCUMENTS

2020/0403854 A1* 12/2020 Arunachalam ....... G06F 16/906
2021/0136170 A1* 5/2021 Katre .................... H04L 67/565
2021/0314407 A1* 10/2021 Ng ........................ G06N 5/027
2022/0086112 A1* 3/2022 Wunderlich .......... H04L 51/212

* cited by examiner

UNIFIED APPLICATION MESSAGING SERVICE

TECHNICAL FIELD

Embodiments of the invention relate generally to the field of software development, and more particularly, to development of software using application messaging.

BACKGROUND

Modern software for enterprise computing is often provided as a service in a scalable, on-demand cloud computing environment, commonly referred to as software as a service (SaaS) hosted on a platform as a service (PaaS). Rather than developing custom software from scratch for each customer, application developers customize the generic functionality provided in enterprise application products for operation on a shared enterprise computing platform. The customizable enterprise application products provide generic functionality for customer relationship management, supply chain management, accounting, marketing, retail and numerous other business and operational needs. Developers often configure services to deliver custom functionality to different customers. One such service is an application messaging service (such as MQTT—Message Queuing Telemetry Transport and AMPQ—Advanced Message Queuing Protocol, DMX—Digital Multiplex 512 Protocol, etc.). An application messaging service is typically used to manage the exchange of application messages between systems/devices using a publish/subscribe paradigm. While the use of application messaging services can aid in the rapid development of applications, the publisher/subscriber typically must be systems/devices communicating via a common network. However, in a modern computing environment, enterprise application products must often be deployed in heterogeneous systems communicating over different networks.

BRIEF DESCRIPTION OF THE DRAWINGS

The included drawings, by way of example only and not limitation, illustrate possible structures and operations for implementing the disclosed inventive systems, apparatus, methods, and computer-readable storage media. The drawings do not limit any changes in form and detail that may be made by one skilled in the art consistent with the spirit and scope of the disclosed implementations.

DETAILED DESCRIPTION

Figure 1:
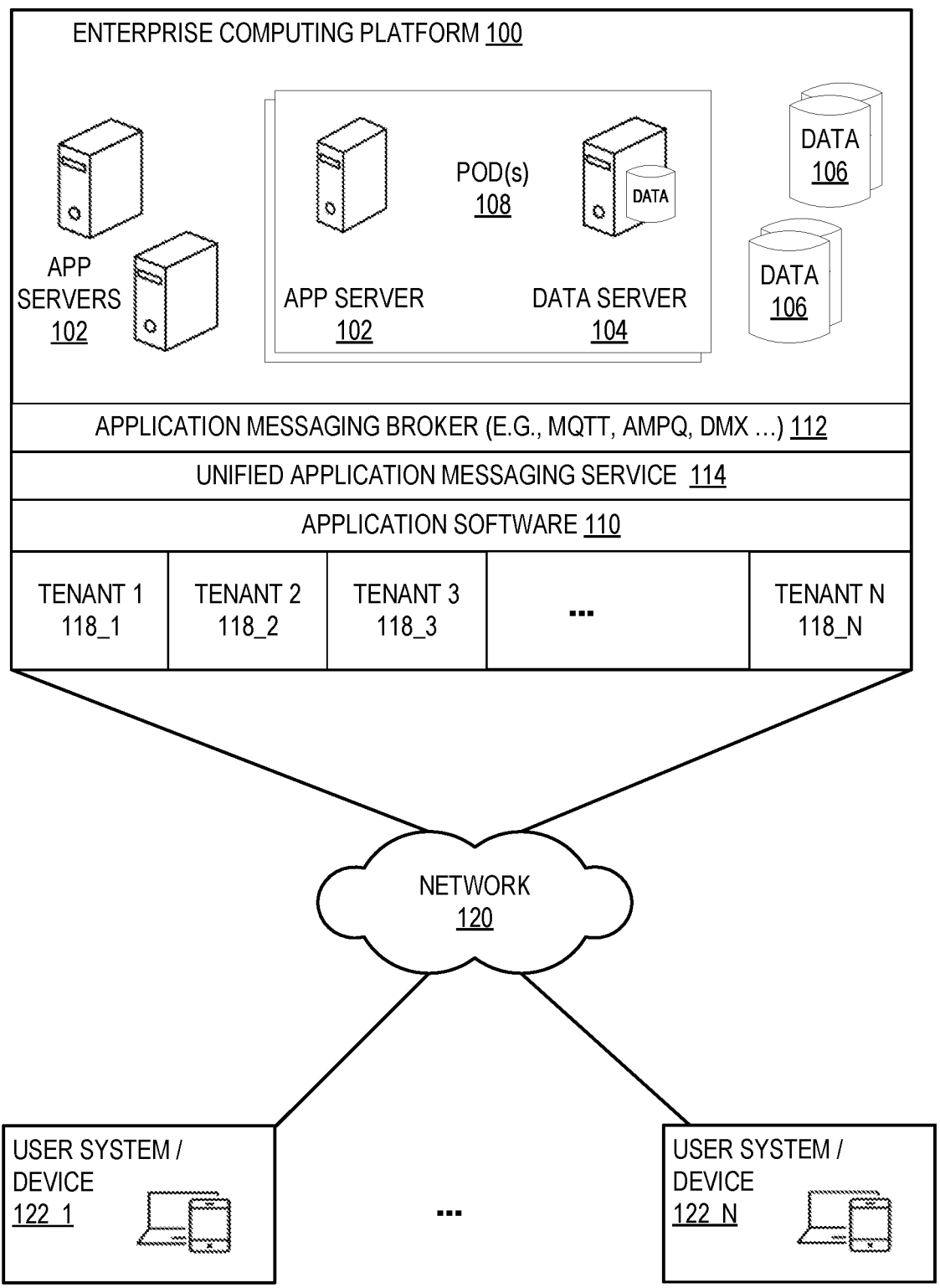
FIG. 1 is a block diagram overview of a system for a unified application messaging service of an enterprise computing platform according to one embodiment.

Because modern software applications must often be developed quickly, developers use generic functionality such as application messaging protocols, such as the aforementioned MQTT, AMPQ and DMX protocols. When communicating with multimode heterogeneous systems/devices, i.e., mobile devices that can communication via more than one communication protocol depending on location, message order sometimes needs to be retained. An example would be a central broker of an application messaging protocol, e.g., MQTT, that needs bidirectional communication between a Bluetooth device, an SSH (secure socket shell) connection to another, as well as a web socket and a LoRa connection with yet another. The application messaging protocols are typically used to manage the exchange of application messages between systems/devices using a publish/subscribe paradigm, where the publisher/subscriber are systems/devices communicating via a common network. This presents a challenge when systems/devices do not communicate via a common network, but rather via multiple networks that support different connection protocols, such as in a mobile computing environment.

For example, in a mobile computing environment, some devices may communicate using a WiFi (Wireless IEEE 802.11x) network connection protocol, a Bluetooth Low Energy (BLE) network connection protocol or a LoRa (Long Range) connection protocol. Some devices may communicate using multiple protocols depending on their proximity to other devices or nodes in a network. Such non-uniform communication between devices makes it difficult to take advantage of application messaging services that are designed for a common network. Supporting all possible communication schemes in an enterprise computing platform presents a significant challenge to developers wanting to use application messaging services for rapid development and deployment of application software.

One conventional solution is for the application developer to create a custom messaging service that supports each different type of communication protocol. But this can be time-consuming and counter-productive. In an enterprise computing platform serving multiple tenants this can be especially problematic since not all applications use the same application messaging service.

To address the challenges of building a customized application that can exchange application messages among different devices using different communication protocols, embodiments of a unified application messaging service enables a developer to use an application messaging service without having to be concerned about the different communication protocols that devices may be using, particularly in a mobile operating environment. This simplifies the development and deployment of the application to the enterprise computing platform while still allowing the application to use an application messaging service originally designed for use only among devices on a common network.

In one embodiment, a network agnostic unified application messaging service is provided to augment the exchange of application messages when the devices are not on a common network, but rather are heterogeneous systems communicating over different networks. The unified application messaging service can be used to manage communications between a central broker, i.e., a message broker that provides the application messaging service, and the heterogeneous devices/systems using the service, i.e., the application users.

In one embodiment, the unified application messaging service comprises a registrar and tracker logic deployed in a unified messaging server/hub that complements an existing application messaging service, such as MQTT, AMPQ, DMX, etc. The registrar and tracker logic typically operates on a server/hub device accessible to other system/user devices using different types of network connections, herein referred to as heterogeneous systems/devices. The registrar and tracking logic registers the network connection protocol of each heterogeneous system/device (e.g., an IoT device) that publishes or subscribes to the application messages being brokered by the message broker. The tracker keeps track of which network connection protocol to use in order to facilitate dispatching and receiving the application messages between the application software, the message broker and one or more of the heterogeneous systems/devices.

FIG. 1 illustrates an example enterprise computing platform 100 in which embodiments of a unified application messaging service can be implemented. Enterprise computing platform 100 can include various application servers 102 and databases 106 connected via a network. During operation of enterprise computing platform 100, different combinations of application servers 102 and data servers 104 can execute various types of application software 110 and access data stored in databases 106.

User systems/devices 122_1 to 122_N typically connect to application servers 102, data server 104 and databases 106 through a network 120. Network 120 includes internal networks (not shown), local area networks (LANs), wide area networks (WANs), privately or publicly switched telephone networks (PSTNs), wireless (Wi-Fi) networks, long range network connections (LoRa), cellular or mobile telecommunications networks, and any other similar networks, or any combination thereof. Enterprise computing platform 100 and user systems 122_1 to 122_N can operate within a private enterprise network, within a publicly accessible web-based network, such as via the Internet, or within any combination of networks.

User systems/devices 122_1 to 122_N can include personal computers (PCs), including workstations, laptop or notebook computers, tablet computers, handheld computing devices, cellular or mobile phones, smartphones, terminals, or any other device capable of accessing network 120 and enterprise computing platform 100. User systems 122_1 to 122_N can use different protocols to communicate with enterprise computing platform 100 over network 120, such as Transmission Control Protocol and Internet Protocol (TCP/IP), Hypertext Transfer Protocol (HTTP), and/or File Transfer Protocol (FTP), to name a few non-limiting examples. In one example, user systems 122_1 to 122_N can operate web browsers or applications that can send and receive HTTP messages to and from an HTTP server operating in enterprise computing platform 100.

Enterprise computing platform 100 in conjunction with application software 110 can provide an almost limitless variety of different services, such as providing software as a service (SaaS), platform as a service (PaaS), customer relationship management (CRM), enterprise resource planning (ERP), file sharing, web-based commerce or e-commerce, social networking, cloud-based computing and/or storage, any other similar service, or any combination thereof. Enterprise computing platform 100 and/or network 120 can be alternatively referred to as a cluster, cloud, and/or cloud-based computing system.

In one embodiment, application software 110 can interoperate with an application messaging broker 112 (e.g., MQTT, AMPQ, DMX, etc.) to managing messaging between user system/devices 122_1, . . . 122_N. As will be described in further detail in FIGS. 2-8, application software 110 can interoperate with the application messaging broker 112 in accordance with embodiments of a unified application messaging service 114 implemented on the enterprise computing platform 100.

In one example, enterprise computing platform 100 and application software 110 can operate as a multi-tenant system (MTS). A multi-tenant system refers to a database system where different hardware and software can be shared by one or more organizations represented as tenants (118_1, 118_2, 118_3, . . . 118_N; collectively "tenants 118"). For example, enterprise computing platform 100 can associate a first tenant 118_1 with an organization that sells airline services, associate a second tenant 118_2 with an organization that sells widgets, and associate a third tenant 118_3 with an organization that sells medical administration services. The multi-tenant system can effectively operate as multiple virtual databases each associated with one of tenants 118.

A pod 108 can include groups of application servers 102, data servers 104 and associated databases 106 that share an instance of the multi-tenant system. Different pods (other pods similar to pod 108, not shown) can operate independently but can share some processing and infrastructure equipment, such as routers (not shown) and storage area networks (SANs) (not shown). For example, tenants 118_2 and 118_3 can operate within pod 108 and a user associated with tenant 118_3 can use user system 122_1 to access the multi-tenant system operating in pod 108.

In one embodiment, user system 122_1 can send requests from the user to a load balancer (not shown) in pod 108. In response, the load balancer can forward the requests to one of application servers 102 within pod 108. Application server 102 can service the requests by executing application software 110 within pod 108, including exchanging application messages between user systems/devices 122_1, 122_2, . . . 122_N using an application messaging broker 112 in conjunction with the unified application messaging service 114. In addition, application server 102 can service the requests by accessing data servers 104 and serving data from databases 106 within pod 108 or from elsewhere as needed.

Enterprise computing platform 100 can include, for example, hundreds of pods like pod 108, and a database administrator can assign thousands of tenants 118 to the same pod 108, in an example embodiment. The database administrator can add new pods 108 for servicing additional tenants 118 and/or can reassign any of tenants 118 to different pods. For example, one of tenants 118 can use a relatively large amount of processing bandwidth and/or use a relatively large amount of storage space. The database administrator can reassign that tenant, e.g., 118_2, to a different pod 108 with more processing bandwidth and/or storage capacity than the originally assigned pod. Thus, the multi-tenant system can scale for practically any number of tenants and users.

Figure 2:
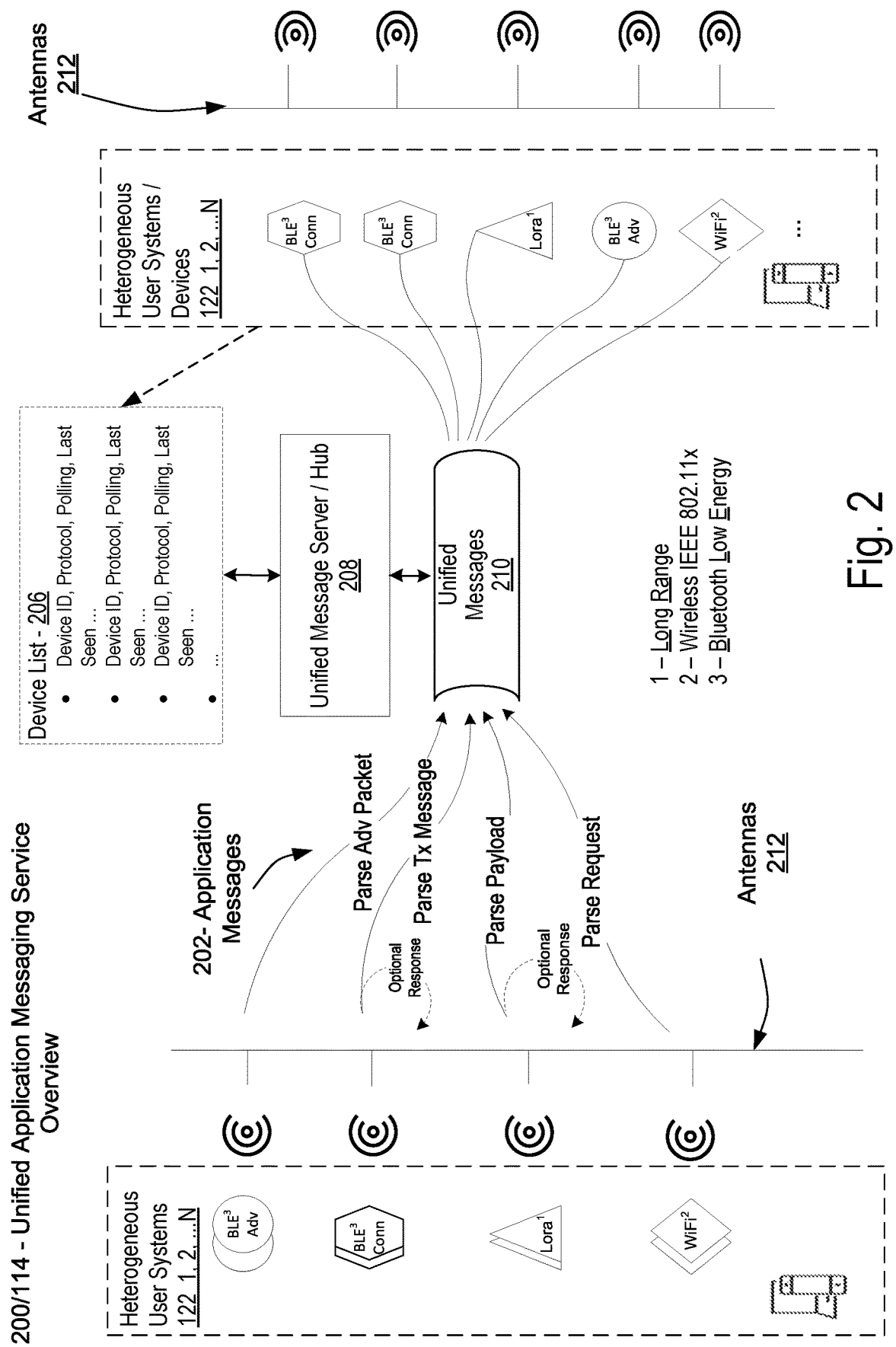
FIG. 2 is a block diagram of additional details of a unified application messaging service of an enterprise computing platform according to one embodiment.

FIG. 2 illustrates additional details of the unified application messaging service 114 described in FIG. 1. In one embodiment, a unified message server/hub 208 manages a device list 206 of all the heterogeneous user systems/devices 122_1, 122_2, . . . 122_N, in a swarm or installation. There will be some devices connected via antennas 212 to nodes (not shown) in a swarm that can inform a device but are unreachable for communication, like devices that are participating in the swarm via a BLE (Bluetooth Low Energy) Advertising communication protocol. Other local devices will have BLE connections, LoRA (LOng RAnge) connections and local WiFi connections. Remote devices can participate in the swarm as well via web sockets (not shown).

Application messages 202 include message payloads of standard format and parsed according to the appropriate communication protocol depending on which communication channel they need to be dispatched to (e.g., BLE Adv, BLE Connected, LoRa, WiFi, etc.). The parsed message payloads are collectively referred to herein as unified messages 210.

In one embodiment, the above-described architecture used to implement the unified application messaging service 114 allows application software to be built quickly across heterogeneous networks of hundreds and thousands of heterogeneous systems/devices 122_1, 122_2, . . . 122_N. This architecture rapid development without requiring the application developer to create and maintain specialized code for managing the different communication protocols.

Figure 3:
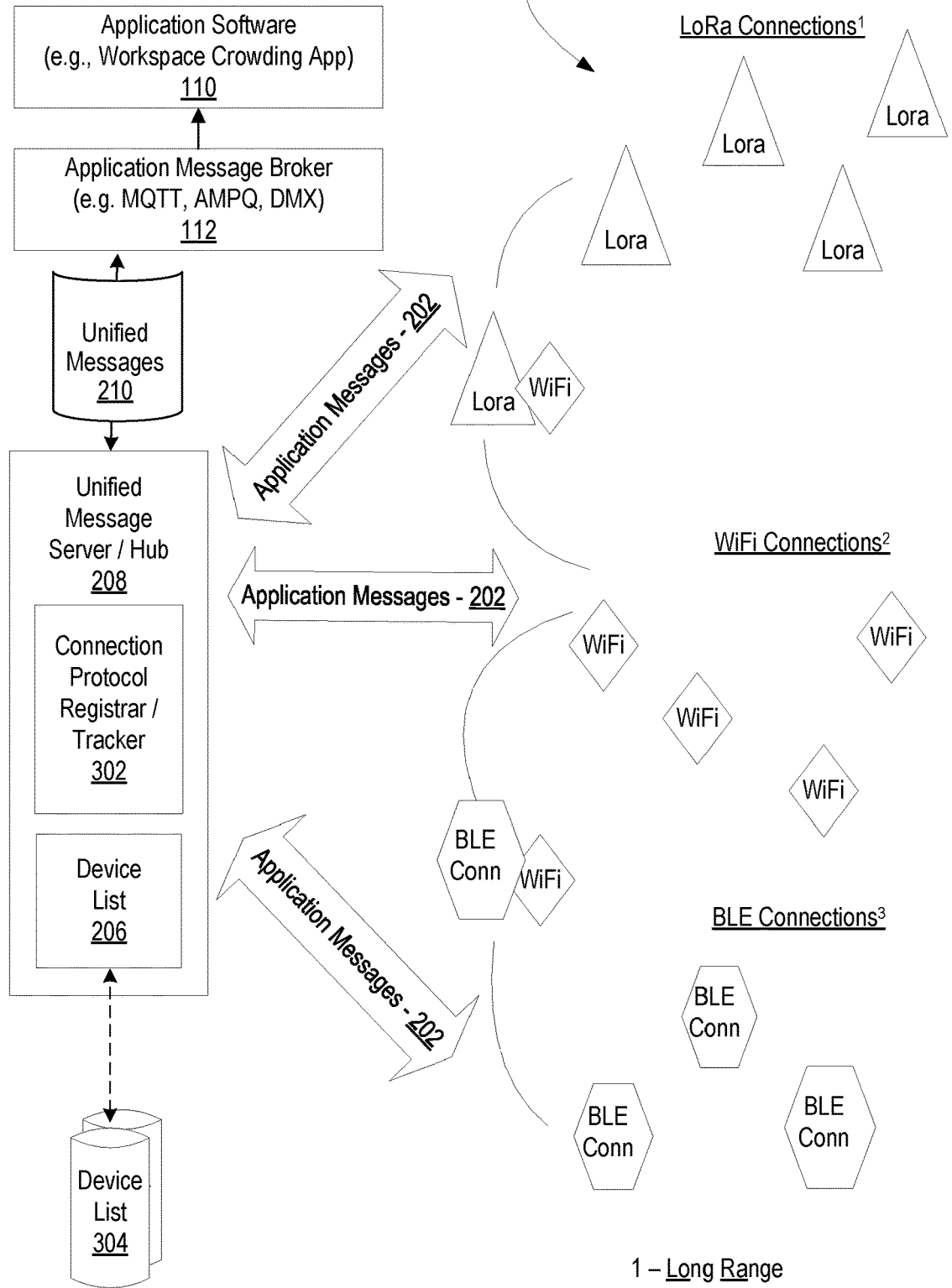
FIG. 3 is a block diagram of additional details of a unified message server/hub of a unified application messaging service of an enterprise computing platform according to one embodiment.

FIG. 3 is a block diagram of additional details of a unified message server/hub 300/208 of a unified application messaging service 200/114 of an enterprise computing platform according to one embodiment. A unified message server/hub 208 includes a connection protocol registrar and tracker logic 302 and a device list 206. The device list 206 may be stored locally on the hub 208 or, in some embodiments, may be stored remotely 304. The unified message server/hub 208 manages application messages 202 received from the various heterogeneous user systems/devices 122_1, 122_2, . . . 122_N. The hub dispatches the message payloads of the application messages 202 as unified messages 210 for processing by an application message broker 112, such as MQTT, AMPQ, DMX and the like. The application messages 202 are processed by an application software 112. One example of application software 112 described further herein includes a workspace crowding app that benefits from the rapid development and deployment to heterogeneous user systems/devices 122_1, 122_2, . . . 122_N.

Figure 4A:
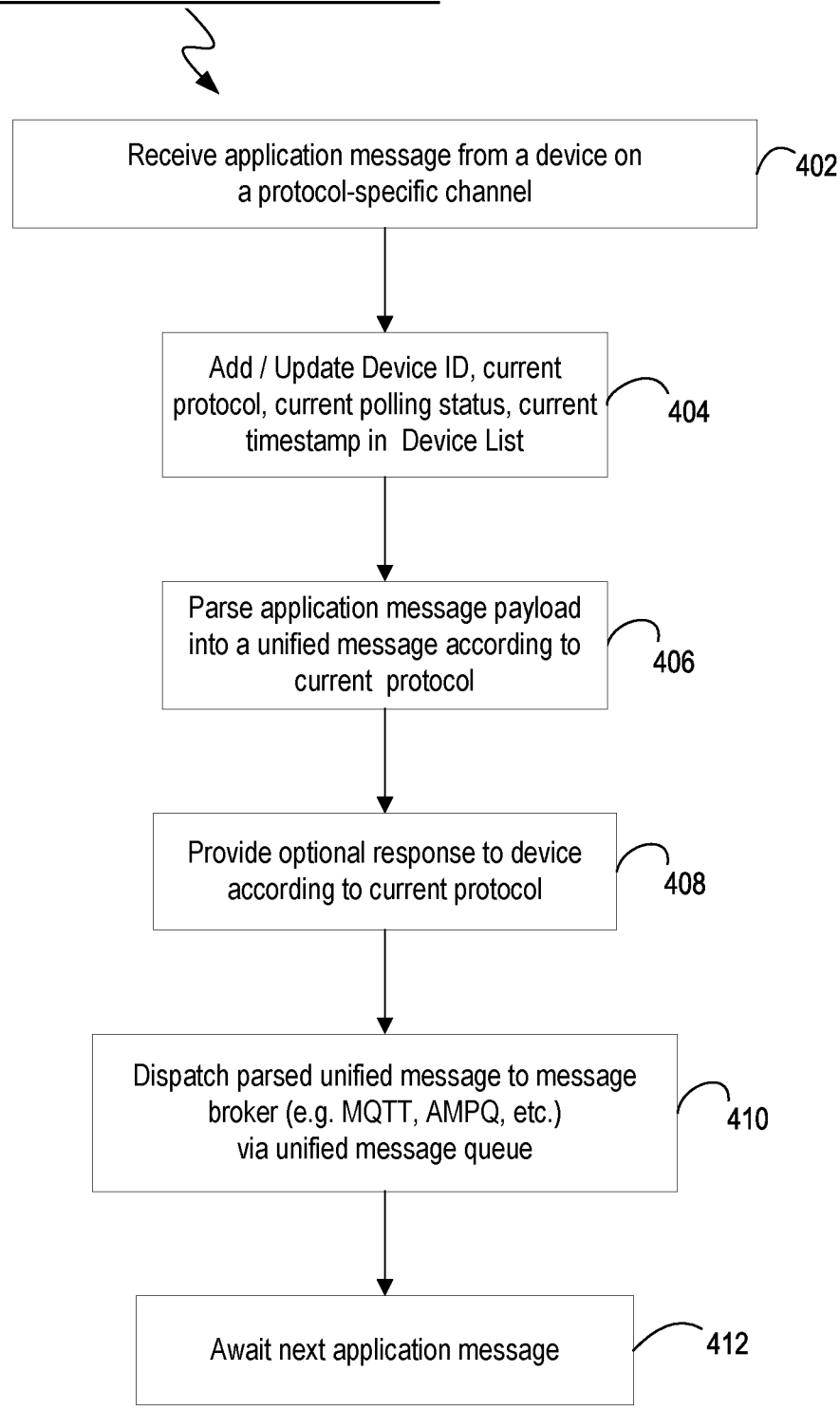
FIGS. 4A-4C illustrates example process flows for a unified message server/hub of a unified application messaging service of an enterprise computing platform according to one embodiment.
Figure 4B:
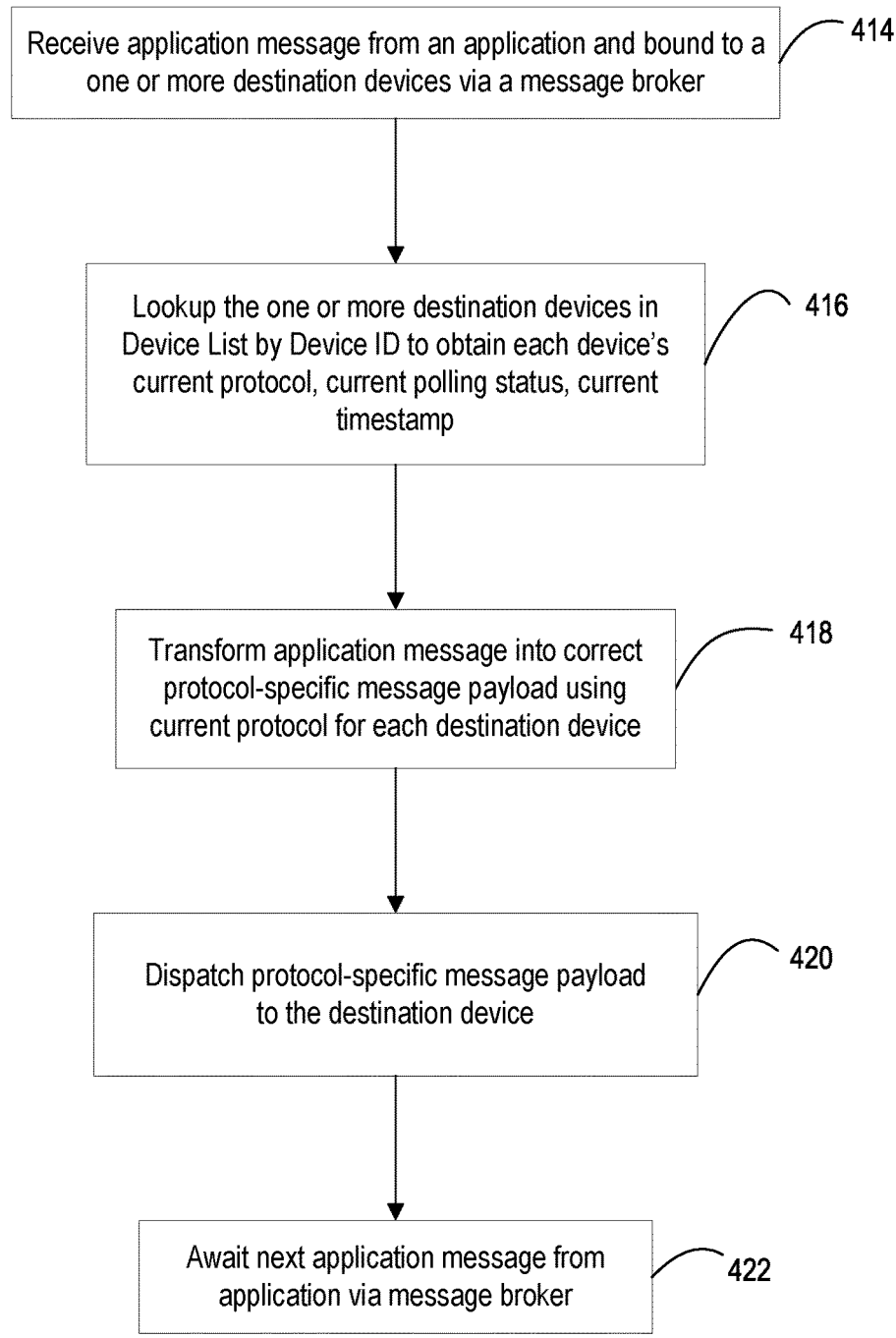
Figure 4C:
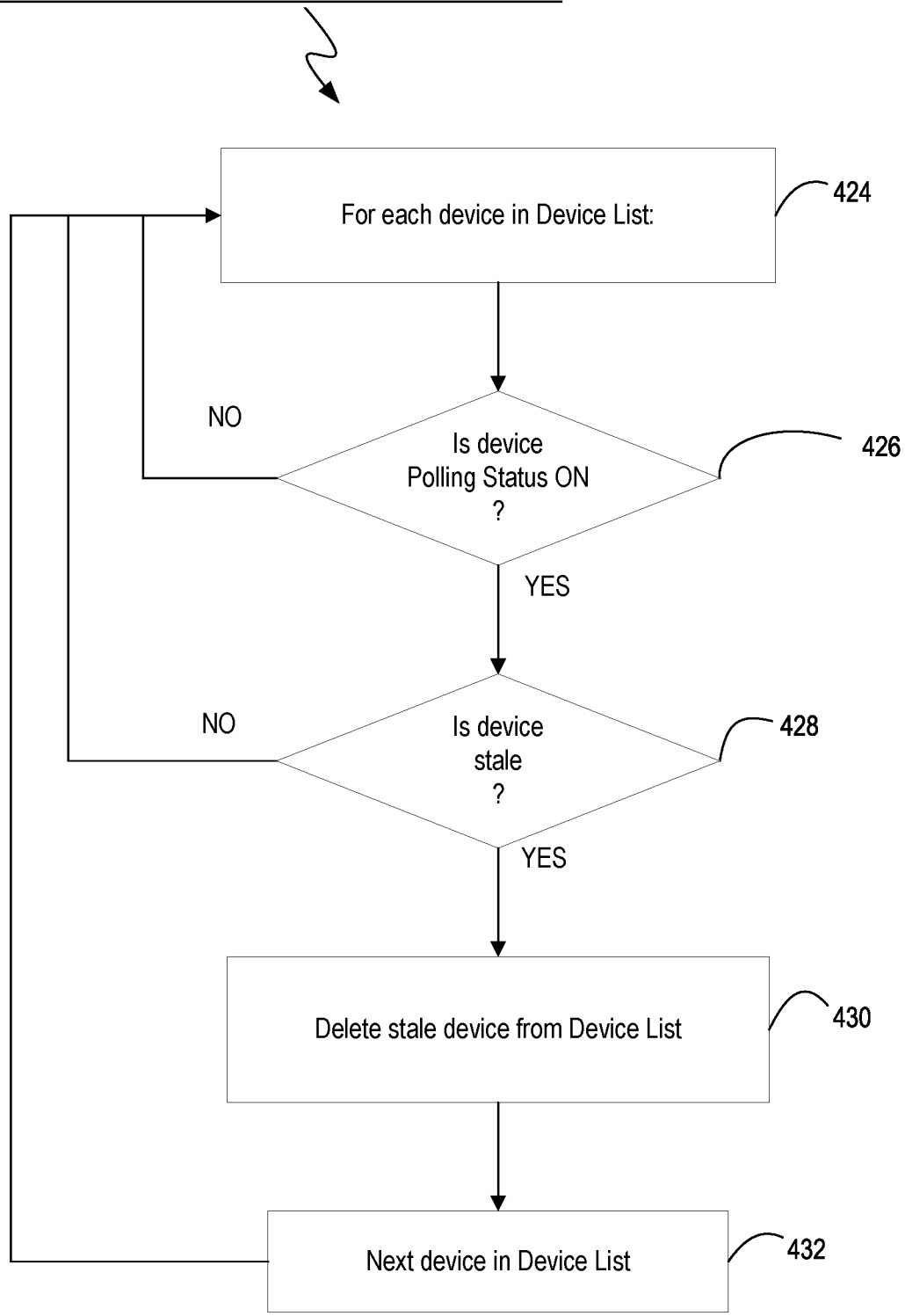

FIGS. 4A-4C illustrates example process flows for a unified message server/hub of a unified application messaging service of an enterprise computing platform according to one embodiment. Process 400A is a process of the connection protocol registrar/tracker logic. At 402, the logic receives an application message from a device on a protocol-specific channel, such as a BLE advertisement or connection, a LoRa connection and the like. At 404, the logic adds or updates a device list with a device ID, the current protocol, a current polling status and a current timestamp. At 406, the logic parses the application message payload into a unified message in accordance with the current protocol. At 408, the logic provides an optional response to the user system/device from which the application message originated in accordance with the current protocol. At 410, the logic dispatches the parsed unified message to a message broker (e.g., MQTT, AMPQ, DMX, etc.) via a unified message queue. Finally, at 412, the logic concludes by awaiting the next application message.

With reference to FIG. 4B, process 400B is another process of the connection protocol registrar/tracker logic. At 414, the logic receives an application message from an application and bound to one or more destination devices via a message broker. The one or more destination devices can be reached using a protocol-specific channel, such as a BLE advertisement or connection, a LoRa connection and the like. At 416, the logic performs a lookup of the one or more destination devices in the device list using the device ID of each destination device. The device list provides the current protocol, current polling status and "last seen" time/date, such as a timestamp of the last time/date the device was polled. At 418, the logic transforms the received application message into the current protocol-specific message payload format for each destination device found on the device list. At 420, the logic dispatches the protocol-specific message payload using the communication channel associated with the current protocol for each destination device. At 422, the logic concludes by awaiting the next application message from an application via a message broker.

With reference to FIG. 4C, process 400C is yet another process of the connection protocol registrar/tracker logic. At 424, for each device in the device list, the logic first checks to determine whether the polling status for the device is on. If so, then the logic further interrogates whether the device is stale, where a stale device is a device that has not communicated with the unified message server/hub containing the logic for over a threshold amount of time, e.g., over 10 minutes, 1 hour, and so forth. At 430, if the device is indeed a stale device, then the information associated with the device can be deleted from the device list. At 432, the logic continues with the next device in the device list until all devices have been processed.

Figure 5:
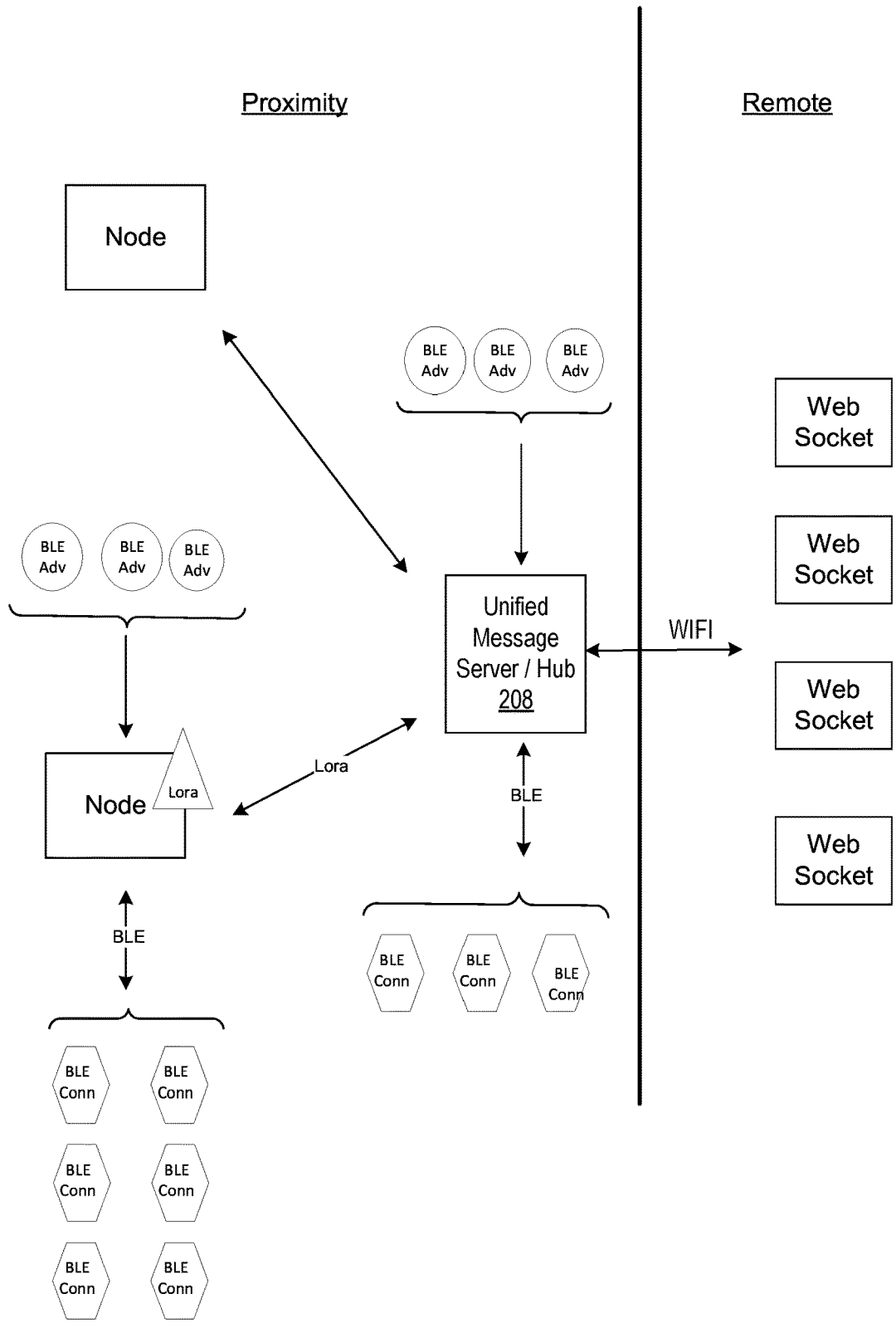
FIG. 5 illustrates an example operating environment for a unified message server/hub of a unified application messaging service of an enterprise computing platform according to one embodiment.

FIG. 5 illustrates an example operating environment for a unified message server/hub of a unified application messaging service of an enterprise computing platform according to one embodiment. In the illustrated example, a unified message server/hub 208 is located in proximity to various heterogeneous devices, such as devices communicating according to a BLE Advertising protocol, either directly, or through a node, and a BLE connected device, also directly or through a node. As shown, the nodes can include a LoRa-enabled node for long-range communication. The unified message server/hub 208 can also communication with a set of remote devices via a WiFi connection and various web sockets.

Figure 6:
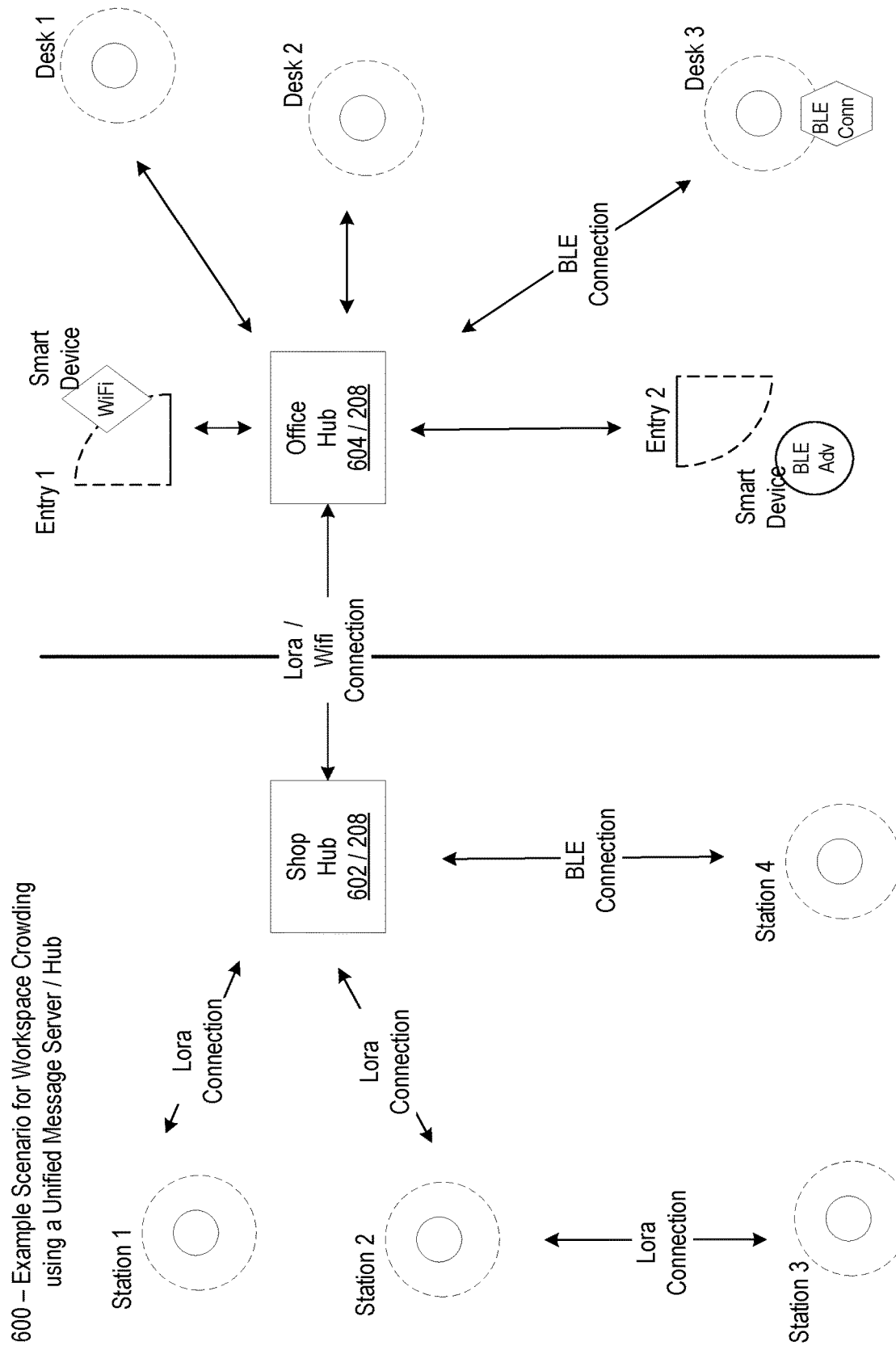
FIG. 6 illustrates an example scenario for a workspace crowding application using a unified message server/hub of a unified application messaging service of an enterprise computing platform according to one embodiment.

FIG. 6 illustrates an example scenario for a workspace crowding application software that can benefit from using a unified message server/hub of a unified application messaging service of an enterprise computing platform according to one embodiment. As shown, there are two hubs 208, one being a shop hub 602/208, and another being an office hub 604/208. Each hub can communication with each other via a LoRa and/or WiFi connection.

As workplace protections for workers become more proximity focused as a result of the ongoing pandemic, effective communications at physical locations will be paramount. By using the unified application messaging service as described herein, apps can be built quickly across heterogeneous networks. The workspace crowding app example 600 illustrates a factory setting/shop floor on the left half of FIG. 6 in which workspace crowding can be monitored to ensure that workers maintain adequate social distancing. On the shop floor, as shown, there are large expanses without WiFi or smart devices. In contrast, on the right half of FIG. 6 illustrates an office floor of corporate offices that is wired with WiFi and full of smart devices. In both locations it is important to maintain social distancing and track any possible violations for later follow up.

As illustrated in FIG. 6, the shop floor has four workstations. Each station is set up to monitor for crowding. Station three is too far from the shop hub 602/208, so it has to communicate through station two to transmit application messages to the shop hub 602/208. Station four is very close to the shop hub 602/208, so it can communicate directly via Bluetooth. As workers move through the shop floor, their proximity to one another and to the workstations will be logged and monitored through the exchange of application messages using the shop hub.

In the office, the stations are better wired to the local network so there is no need for LoRa connections. All of the messages payloads of the application messages will be the same, but the transmission on the office floor will be different from the shop floor. As illustrated on the right half of FIG. 6, there are two entry ways to the office floor. One (Entry 2) is illustrated as being accessed by a smart device with only a BLE Advertising data, the other (Entry 1) is being accessed by a smart device with a WiFi connection. Messages can be routed all the way across the system to any smart node or device. The office floor also has three desks. As illustrated, at one (Desk 3) there is a user who has a direct Bluetooth connection to the station. As workers move through the office floor, their proximity to one another and to the workstations will be logged and monitored through the exchange of application messages using the office hub.

Despite all of the various heterogeneous ways that the user systems/devices can communicate with the shop hub 602/208 and office hub 604/208, the workspace crowding application software can successfully be deployed for all of the users across both the shop floor and office floor because of the unified application messaging service deployed to the shop hub and office hub as described herein.

Figure 7A:
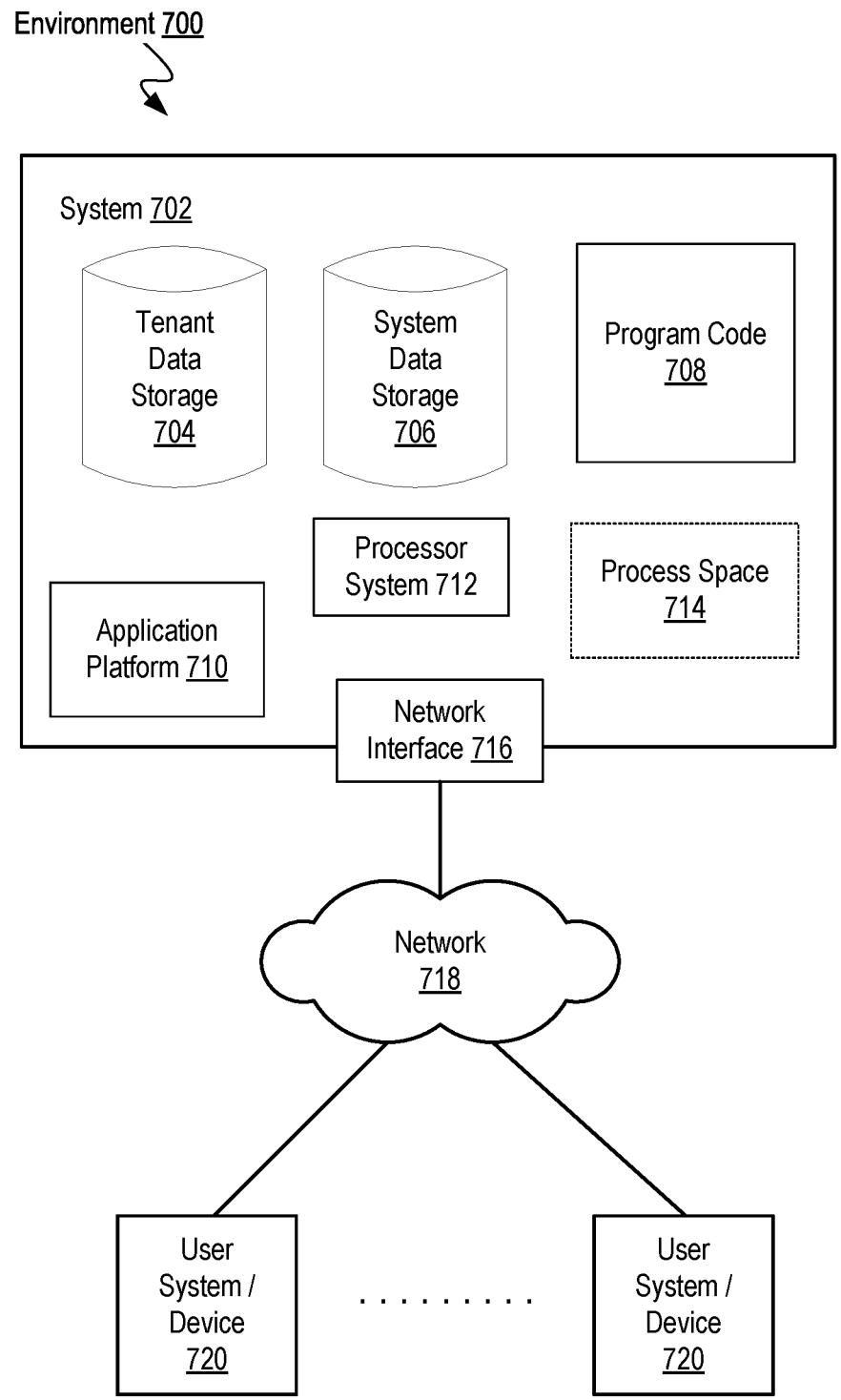
FIGS. 7A-7B are block diagrams illustrating an overview of a cloud computing environment within which one or more implementations of a unified application messaging service of an enterprise computing platform can be carried out according to one embodiment.

FIG. 7A illustrates a block diagram of an environment 700 in which an enterprise computing platform that supports a unified application messaging service can be implemented in accordance with the described embodiments. Environment 700 may include user systems 720, network 718, system 702, processor system 712, application platform 710, network interface 716, tenant data storage 704, system data storage 706, program code 708, and process space 714. In other embodiments, environment 700 may not have all the components listed and/or may have other elements instead of, or in addition to, those listed above.

Environment 700 includes an environment in which an on-demand database service exists as part of an enterprise computing platform. User system 720 may be any machine or system that is used by a user to access a database user system. For example, any of user systems 720 can be a handheld computing device, a mobile phone, a laptop computer, a work station, and/or a network of computing devices. As illustrated in FIG. 7A (and in more detail in FIG. 7B) user systems 720 might interact via a network 718 with an on-demand database service, which is system 702.

An on-demand database service, such as system 702, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 702" and "system 702" is used interchangeably herein. A database image may include one or more database objects. A relational database management system (RDMS) or the equivalent may execute storage and retrieval of information against the database object(s). Application platform 710 may be a framework that allows the applications of system 702 to run, such as the hardware and/or software, e.g., the operating system. In an embodiment, on-demand database service 702 may include an application platform 710 that enables creation, managing and executing one or more applications developed by the provider of the on-demand database service, users accessing the on-demand database service via user systems 720, or third party application developers accessing the on-demand database service via user systems 720.

The users of user systems 720 may differ in their respective capacities, and the capacity of a user system 720 might be entirely determined by permissions (permission levels) for the current user. For example, where a salesperson is using a user system 720 to interact with system 702, that user system has the capacities allotted to that salesperson. However, while an administrator is using that user system to interact with system 702, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 718 is any network or combination of networks of devices that communicate with one another. For example, network 718 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 720 might communicate with system 702 using TCP/IP and, at a higher network level, use other common Internet protocols to communicate, such as HTTP, FTP, AFS, WAP, etc. In an example where HTTP is used, user system 720 might include an HTTP client commonly referred to as a "browser" for sending and receiving HTTP messages to and from an HTTP server at system 702. Such an HTTP server might be implemented as the sole network interface between system 702 and network 718, but other techniques might be used as well or instead. In some implementations, the interface between system 702 and network 718 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 702, shown in FIG. 7A, implements a web-based customer relationship management (CRM) system. For example, in one embodiment, system 702 includes application servers configured to implement and execute CRM software applications as well as provide related data, code, forms, webpages and other information to and from user systems 720 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 702 implements applications other than, or in addition to, a CRM application. For example, system 702 may provide tenant access to multiple hosted (standard and custom) applications, including a CRM application. User (or third-party developer) applications, which may or may not include CRM, may be supported by the application platform 710, which manages creation, storage of the applications into one or more database objects and executing of the applications in a virtual machine in the process space of the system 702.

One arrangement for elements of system 702 is shown in FIG. 7A, including a network interface 716, application platform 710, tenant data storage 704 for tenant data 705, system data storage 706 for system data 707 accessible to system 702 and possibly multiple tenants, program code 708 for implementing various functions of system 702, and a process space 714 for executing MTS system processes and tenant-specific processes, such as running applications as part of an application hosting service. Additional processes that may execute on system 702 include database indexing processes.

Several elements in the system shown in FIG. 7A include conventional, well-known elements that are explained only briefly here. For example, each user system 720 may include a desktop personal computer, workstation, laptop, PDA, cell phone, or any wireless access protocol (WAP) enabled device or any other computing device capable of interfacing directly or indirectly to the Internet or other network connection. User system 720 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 720 to access, process and view information, pages and applications available to it from system 702 over network 718. Each user system 720 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 702 or other systems or servers. For example, the user interface device can be used to access data and applications hosted by system 702, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 720 and all its components are operator configurable using applications, such as a browser, including computer code run using a central processing unit such as an Intel processor or the like. Similarly, system 702 (and additional instances of an MTS, where more than one is present) and all of their components might be operator configurable using application(s) including computer code to run using a central processing unit such as processor system 712, which may include one or more processor units.

According to one embodiment, each system 702 is configured to provide webpages, forms, applications, data and media content to user (client) systems 720 to support the access by user systems 720 as tenants of system 702. As such, system 702 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7B:
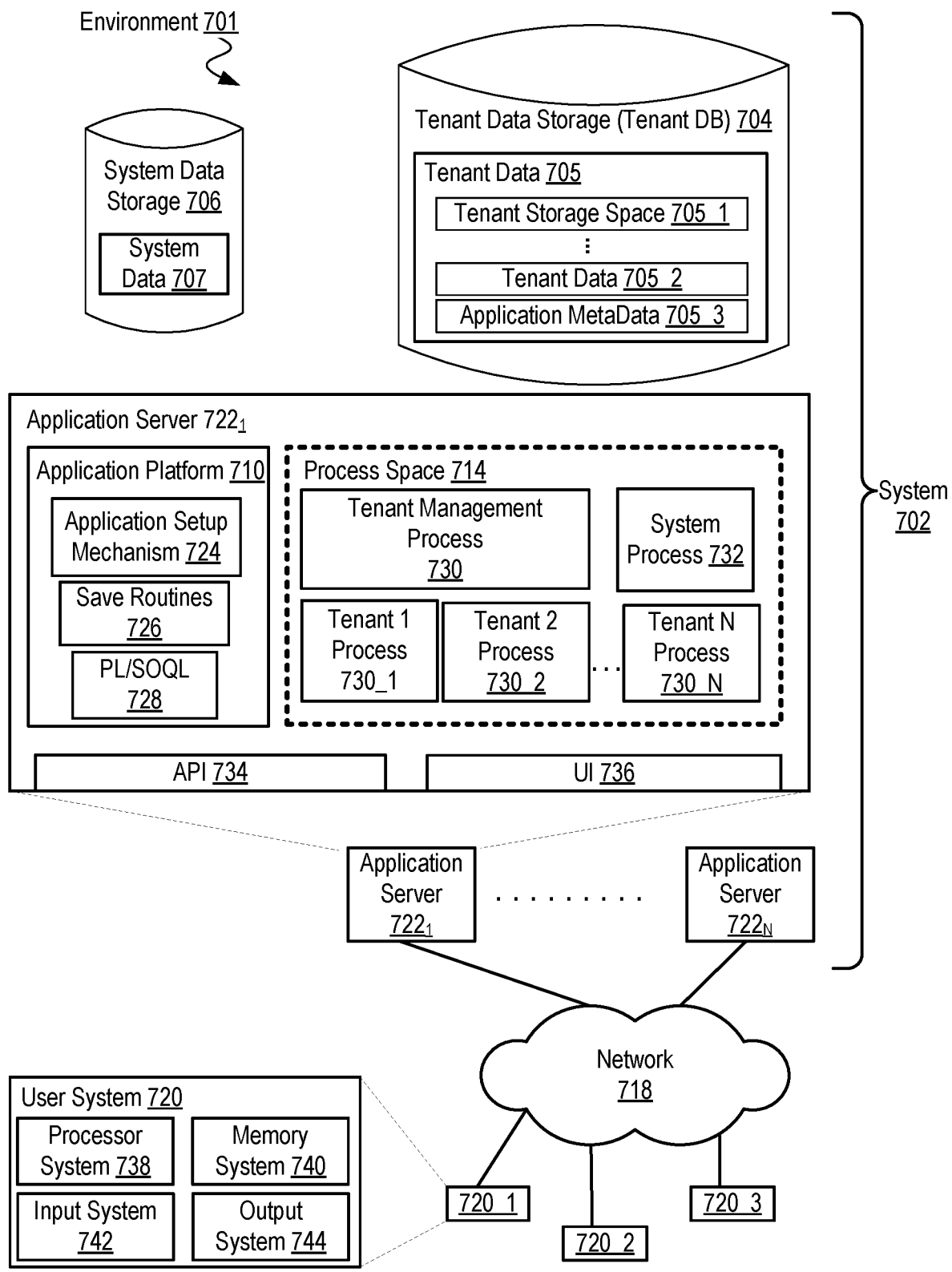

FIG. 7B illustrates another block diagram of an embodiment of elements of FIG. 7A and various possible interconnections between such elements in accordance with the described embodiments. FIG. 7B also illustrates environment 701. However, in FIG. 7B, the elements of system 702 and various interconnections in an embodiment are illustrated in further detail. More particularly, FIG. 7B shows that user system 720 may include a processor system 738, memory system 740, input system 742, and output system 744. FIG. 7B shows network 718 and system 702. FIG. 7B also shows that system 702 may include tenant data storage 704, having therein tenant data 705, which includes, for example, tenant storage space 705_1, tenant data 705_2, and application metadata 705_3. System data storage 706 is depicted as having therein system data 707. Further depicted within the expanded detail of application servers $722_1$_N are User Interface (UI) 736, Application Program Interface (API) 734, application platform 710 includes PL/SOQL 728, save routines 726, application setup mechanism 724, process space 714 includes system process space 732, tenant 1-N process spaces 730_1, and tenant management process space 730. In other embodiments, environment 701 may not have the same elements as those listed above and/or may have other elements instead of, or in addition to, those listed above.

User system 720, network 718, system 702, tenant data storage 704, and system data storage 706 were discussed above in FIG. 7A. As shown by FIG. 7B, system 702 may include a network interface 716 (of FIG. 7A) implemented as a set of HTTP application servers 722, an application platform 710, tenant data storage 704, and system data storage 706. Also shown is system process space 732, including individual tenant process spaces 730_1 and a tenant management process space 730. Each application server 722 may be configured to tenant data storage 704 and the tenant data 705 therein, and system data storage 706 and the system data 707 therein to serve requests of user systems 720. The tenant data 705 might be divided into individual tenant storage areas (e.g., tenant storage space 705_1), which can be either a physical arrangement and/or a logical arrangement of data. Within each tenant storage space 705_1, tenant data 705_2, and application metadata 705_3 might be similarly allocated for each user. For example, a copy of a user's most recently used (MRU) items might be stored to tenant data 705_2. Similarly, a copy of MRU items for an entire organization that is a tenant might be stored to tenant storage space 705_1. A UI 736 provides a user interface and an API 734 provides an application programmer interface into system 702 resident processes to users and/or developers at user systems 720. The tenant data and the system data may be stored in various databases, such as one or more Oracle™ databases.

Application platform 710 includes an application setup mechanism 724 that supports application developers' creation and management of applications, which may be saved as metadata into tenant data storage 704 by save routines 726 for execution by subscribers as one or more tenant process spaces 730_1 managed by tenant management process space 730 for example. Invocations to such applications may be coded using PL/SOQL 728 that provides a programming language style interface extension to API 734. Invocations to applications may be detected by one or more system processes, which manage retrieving application metadata 705_3 for the subscriber making the invocation and executing the metadata as an application in a virtual machine.

Each application server 722 may be communicably coupled to database systems, e.g., having access to system data 707 and tenant data 705, via a different network connection. For example, one application server 722i might be coupled via the network 718 (e.g., the Internet), another application server 722N-1 might be coupled via a direct network link, and another application server 722N might be coupled by yet a different network connection. Transfer Control Protocol and Internet Protocol (TCP/IP) are typical protocols for communicating between application servers 722 and the database system. However, it will be apparent to one skilled in the art that other transport protocols may be used to optimize the system depending on the network interconnect used.

In certain embodiments, each application server 722 is configured to handle requests for any user associated with any organization that is a tenant. Because it is desirable to be able to add and remove application servers from the server pool at any time for any reason, there is preferably no server affinity for a user and/or organization to a specific application server 722. In one embodiment, therefore, an interface system implementing a load balancing function (e.g., an F5 Big-IP load balancer) is communicably coupled between the application servers 722 and the user systems 720 to distribute requests to the application servers 722. In one embodiment, the load balancer uses a least connections algorithm to route user requests to the application servers 722. Other examples of load balancing algorithms, such as round robin and observed response time, also can be used. For example, in certain embodiments, three consecutive requests from the same user may hit three different application servers 722, and three requests from different users may hit the same application server 722. In this manner, system 702 is multi-tenant, in which system 702 handles storage of, and access to, different objects, data and applications across disparate users and organizations.

As an example of storage, one tenant might be a company that employs a sales force where each salesperson uses system 702 to manage their sales process. Thus, a user might maintain contact data, leads data, customer follow-up data, performance data, goals and progress data, etc., all applicable to that user's personal sales process (e.g., in tenant data storage 704). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 702 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 702 might also maintain system level data usable by multiple tenants or other data. Such system level data might include industry reports, news, postings, and the like that are sharable among tenants.

In certain embodiments, user systems 720 (which may be client systems) communicate with application servers 722 to request and update system-level and tenant-level data from system 702 that may require sending one or more queries to tenant data storage 704 and/or system data storage 706. System 702 (e.g., an application server 722 in system 702) automatically generates one or more SQL statements (e.g., one or more SQL queries) that are designed to access the desired information. System data storage 706 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The term "user" may refer to a system user, such as, but not limited to, a software/application developer, a system administrator, a database administrator, an information technology professional, a program manager, product manager, etc. The term "user" may also refer to an end-user, such as, but not limited to, an organization (e.g., a business, a company, a corporation, a non-profit entity, an institution, an agency, etc.) serving as a customer or client of the provider (e.g., Salesforce.com®) of a user device (such as user device 180 in FIG. 1) or an organization's representative, such as a salesperson, a sales manager, a product manager, an accountant, a director, an owner, a president, a system administrator, a computer programmer, an information technology ("IT") representative, etc.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com, Salesforce1®, Apex™ code, JavaScript™, jQuery™, Developerforce™, Visualforce™, Service Cloud Console Integration Toolkit™ ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

Figure 8:
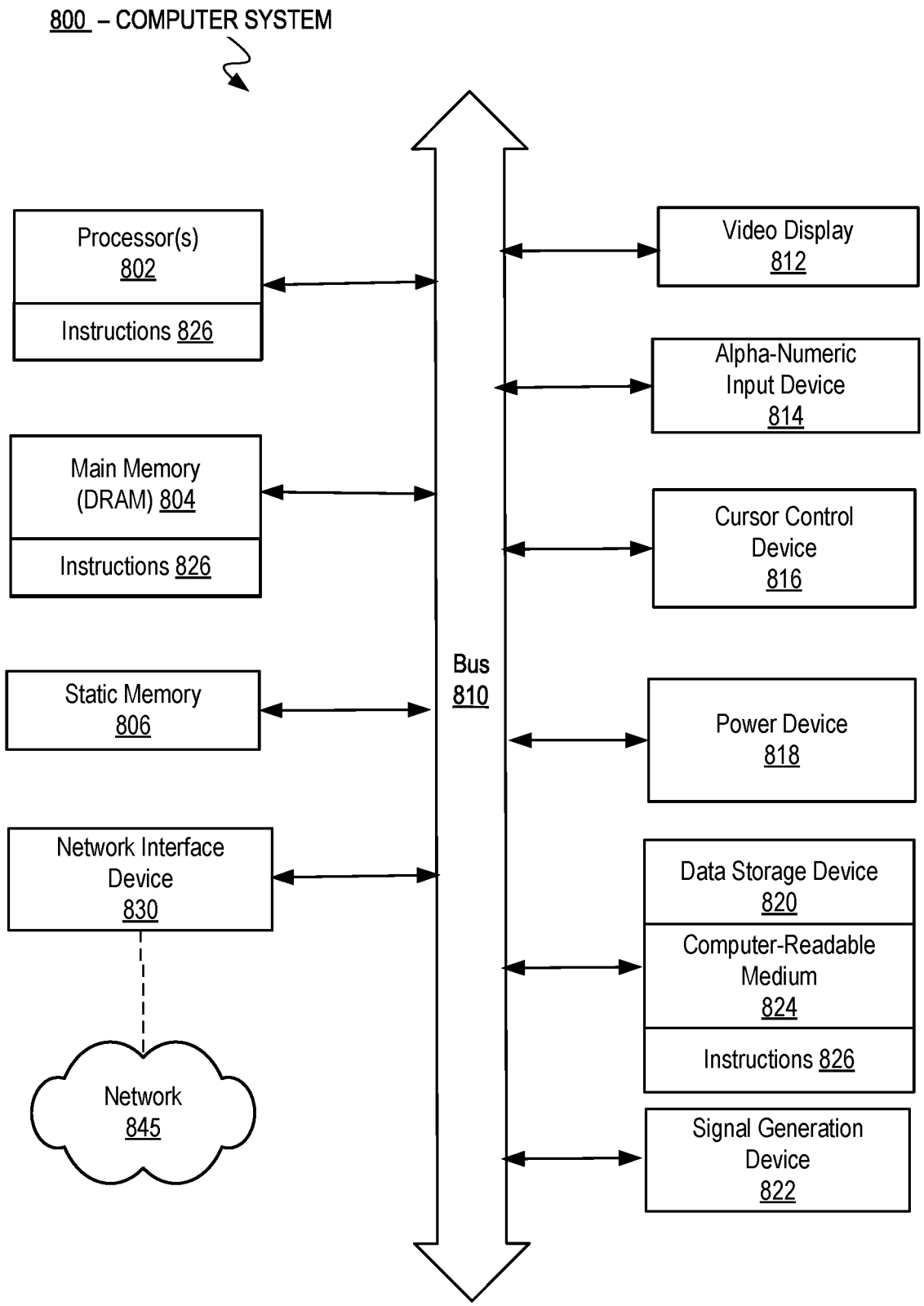
FIG. 8 is a block diagram illustrating a machine in the exemplary form of a general computer system within which one or more implementations of a unified application messaging service of an enterprise computing platform can be carried out according to one embodiment.

FIG. 8 illustrates a diagrammatic representation of a machine in the exemplary form of a computer system 800 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 800 may be utilized by or illustrative of any of the electronic components described herein (e.g., any of the components illustrated in or described with respect to FIGS. 1, 2, 3, 4A-4C, 5, 6 and 7A-7B).

The exemplary computer system 800 includes a processing device (processor) 802, a main memory 804 (e.g., ROM, flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 820, which communicate with each other via a bus 810.

Processor 802 represents one or more general-purpose processing devices such as a microprocessor, central processing unit, or the like. More particularly, processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute instructions 826 for performing the operations and steps discussed herein. Processor 802 may have one or more processing cores.

Computer system 800 may further include a network interface device 830. Computer system 800 also may include a video display unit 812 (e.g., a liquid crystal display (LCD), a cathode ray tube (CRT), or a touch screen), an alphanumeric input device 814 (e.g., a keyboard), a cursor control device 816 (e.g., a mouse or touch screen), and a signal generation device 822 (e.g., a loud speaker).

Power device 818 may monitor a power level of a battery used to power computer system 800 or one or more of its components. Power device 818 may provide one or more interfaces to provide an indication of a power level, a time window remaining prior to shutdown of computer system 800 or one or more of its components, a power consumption rate, an indicator of whether computer system is utilizing an external power source or battery power, and other power related information. In some implementations, indications related to power device 818 may be accessible remotely (e.g., accessible to a remote back-up management module via a network connection). In some implementations, a battery utilized by power device 818 may be an uninterruptable power supply (UPS) local to or remote from computer system 800. In such implementations, power device 818 may provide information about a power level of the UPS.

Data storage device 820 may include a computer-readable storage medium 824 (e.g., a non-transitory computer-readable storage medium) on which is stored one or more sets of instructions 826 (e.g., software) embodying any one or more of the methodologies or functions described herein. Instructions 826 may also reside, completely or at least partially, within main memory 804 and/or within processor 802 during execution thereof by computer system 800, main memory 804, and processor 802 also constituting computer-readable storage media. Instructions 826 may further be transmitted or received over a network 845 via network interface device 830.

In one implementation, instructions 826 include instructions for performing any of the implementations described herein. While computer-readable storage medium 824 is shown in an exemplary implementation to be a single medium, it is to be understood that computer-readable storage medium 824 may include a single medium or multiple media (e.g., a centralized or distributed database, and/or associated caches and servers) that store the one or more sets of instructions.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A computer-implemented method comprising:
   receiving an application message on a protocol-specific channel from a first device of a plurality of heterogeneous devices communicating over different protocol-specific channels, the application message being generated via a first application;
   tracking, for the first device, a current connection protocol based on the protocol-specific channel on which the application message was received, wherein tracking includes updating a device list, wherein updating the device list includes responsive to receiving an application message published by the first device, storing for the first device, in the device list, information specifying the current connection protocol in association with a device identifier of the first device;
   generating a unified application message that includes a payload of the application message based, at least in part, on the current connection protocol, wherein generating includes parsing the application message based on the current connection protocol;
   dispatching, via a unified message queue, the unified application message to an application message broker, the message broker configured to broker the application message between the first device and one or more second devices, the one or more second devices being subscribers to the application message;
   brokering, by the application message broker, the application message from the first device to the one or more second devices;
   determining whether the first device is stale; and
   deleting the information from the device list according to a result of determining whether the first device is stale.

2. The computer-implemented method of claim 1, wherein a connection protocol includes any of a LoRa connection protocol, a WiFi connection protocol and a Bluetooth connection protocol.

3. The computer-implemented method of claim 1, wherein brokering the application message is performed in accordance with an application messaging protocol, including any of MQTT, AMPQ and DMX protocols.

4. The computer-implemented method of claim 1, wherein receiving the application message from the first device includes receiving the application message in a unified message hub operating on a server in communication with the first device and the one or more second devices.

5. The computer-implemented method of claim 4, wherein the server is an application server of a platform as a service (PaaS) providing a unified application messaging service to interface with the application message broker, the unified application messaging service providing the unified message hub to facilitate brokering application messages between the plurality of heterogeneous devices communicating over different protocol-specific channels.

6. A system for a computing platform having a unified application messaging service comprising:
   at least one processor capable of executing instructions in a server hosting a unified message hub, the server coupled to a computing platform; and
   a memory storing instructions to cause the processor to:
   receive an application message on a protocol-specific channel from a first device of a plurality of heterogeneous devices communicating over different protocol-specific channels, the application message being generated via a first application;
   track for the first device, a current connection protocol based on the protocol-specific channel on which the application message was received, wherein tracking includes a) storing for the first device, in a device list, information including an indication of the current connection protocol and b) updating the current connection protocol stored in the device list responsive to any of receiving a new application message or a polling status from the first device;
   track, for the first device, a current connection protocol based on the protocol-specific channel on which the application message was received, wherein tracking includes updating a devcie list, wherein updating the device list includes responsive to receiving an application message published by the first device, storing for the first device, in the device list, information specifying the current connection protocol in association with a device identifier of the first device;
   generating a unified application message that includes a payload of the application message based, at least in part, on the current connection protocol, wherein generating includes parsing the application message based on the current connection protocol;
   dispatch, via a unified message queue, the unified application message to an application message broker, the message broker configured to broker the application message between the first device and one or more second devices, the one or more second devices being subscribers to the application message;
   broker, by the application message broker, the application message from the first device to the one or more second devices;
   determine whether the first device is stale; and
   delete the information from the device list according to a result of determining whether the first device is stale.

7. The system of claim 6, wherein a connection protocol includes any of a LoRa connection protocol, a WiFi connection protocol and a Bluetooth connection protocol.

8. The system of claim 6, wherein to broker the application message is performed in accordance with an application messaging protocol, including any of MQTT, AMPQ and DMX protocols.

9. The system of claim 6, wherein to receive the application message from the first device includes to receive the application message in a unified message hub operating on a server in communication with the first device and the one or more second devices.

10. The system of claim 9, wherein the server is an application server of a platform as a service (PaaS) providing a unified application messaging service to interface with the application message broker, the unified application messaging service providing the unified message hub to facilitate application messages brokered between the plurality of heterogeneous devices communicating over different protocol-specific channels.

11. At least one tangible, non-transitory computer-readable storage medium having instructions encoded thereon which, when executed by a processing device, cause the processing device to:
  receive an application message on a protocol-specific channel from a first device of a plurality of heterogeneous devices communicating over different protocol-specific channels, the application message being generated via a first application;
  track for the first device, a current connection protocol of the first device based on the protocol-specific channel on which the application message was received, wherein tracking inlcudes updating a device list, wherein updating the device list includes responsive to receiving an application message published by the first device, storing for the first device, in the device list, information specifying the current connection protocol in association with a device identifier of the first device;
  generate a unified application message that includes a payload of the application messaged based, at least in part, on the current protocol, wherein generating includes parsing the application message based on the current connection protocol;
  dispatch, via a unified message queue, the unified application message to an application message broker, the message broker configured to broker the application message between the first device and one or more second devices, the one or more second devices being subscribers to the application message;
  broker, by the application message broker, the application message from the first device to the one or more second devices;
  determine whether the first device is stale; and
  delete the information from the device list according to a result of determining whether the first device is stale.

12. The at least one tangible, non-transitory computer-readable storage medium of claim 11, wherein a connection protocol includes any of a LoRa connection protocol, a WiFi connection protocol and a Bluetooth connection protocol.

13. The at least one tangible, non-transitory computer-readable storage medium of claim 11, wherein to broker the application message is performed in accordance with an application messaging protocol, including any of MQTT, AMPQ and DMX protocols.

14. The at least one tangible, non-transitory computer-readable storage medium of claim 11, wherein the instructions to receive the application message from the first device are performed in a processor of a unified message hub operating on a server in communication with the first device and the one or more second devices.

15. The at least one tangible, non-transitory computer-readable storage medium of claim 14, wherein:
  the server is an application server of a platform as a service (PaaS) providing a unified application messaging service to interface with the application message broker, the unified application messaging service including the instructions performed in the processor of the unified message hub, the unified application messaging service to facilitate application messages brokered between the plurality of heterogeneous devices communicating over different protocol-specific channels.

* * * * *